United States Patent [19]

Dworzecki

[11] Patent Number: 5,606,695
[45] Date of Patent: Feb. 25, 1997

[54] METHOD OF SCHEDULING SUCCESSIVE TASKS SUBJECT ONLY TO TIMING CONSTRAINTS

[75] Inventor: Jozef Dworzecki, Fontenay le Fleury, France

[73] Assignee: Cegelec, Levallois Perret, France

[21] Appl. No.: 510,533

[22] Filed: Aug. 2, 1995

[30] Foreign Application Priority Data

Aug. 11, 1994 [FR] France .................................. 9409952

[51] Int. Cl.$^6$ .................................................... G06F 9/46
[52] U.S. Cl. ...................................... 395/208; 364/DIG. 1; 364/281.8; 364/281.6; 364/281.7; 364/281.3
[58] Field of Search ......................... 395/650; 364/281.8, 364/281.6, 281.7, 281.3

[56] References Cited

PUBLICATIONS

Zhao et al, Simple and Integrated Hevristics, Journal of Systems and Software, vol. 7, pp. 195–205, 1987.
Yuan et al, A Decomposition Approach to Non–Preemptive Scheduling in Hard Real–Time Systems, 1989, pp. 240–248.
Schwan et al, Dynamic Scheduling of Hard Real–Time Tasks and Real–Time Thread S, IEEE Trans. on Software Engr., vol. 18, No. 8 Aug. 1992.
Al–Mouhamed, Lower Bound on the Number of Processors and Time for Scheduling Precedence Graphs with Communications Costs, IEEE Transactions on Software Engnr. v8 16 No. 12 Dec. 1990.
Stankovic et al, The Spring Kernel: A New Paradigm for Real–Time Systems, IEEE Software, v;8, issue 3 May 1991, pp. 62–72.
Lorts et al, Empirical Evalvation of Weighted and Prioritzed Static Scheduling Hevristics for Real–Time Multiprocessing Parallel and Distributed Real–Time Systems, Conf Date: 28–29 Apr. 1994, pp. 58–63.

Saksena et al, Temporal Analysis for Hard Real–Time Scheduling, Computers & Communications, 1993 Int'l Phoenix Conference, pp. 538–544.
*IEEE Transaction on Software Engineering*, vol. SE–13, No. 5, May 1987, New York, US pp. 564–576, Wei Zhao et al, "Scheduling Tasks with Resource Requirements in Hard Real–Time Systems".
*Real Time Systems*, vol. 1, No. 1, Jun. 1989, Dordrecht, NL, pp. 27–60; Brinkley Sprunt et al, "A Periodic Task Scheduling for Hard–Real–Time Systems".
*Proceedings of the IEEE*, vol. 82, No. 1, Jan. 1994, New York, US, pp. 55–67, Krithi Ramamritham et al, "Scheduling Algorithms and Operating Systems Support for Real–Time Systems".

*Primary Examiner*—Kevin A. Kriess
*Assistant Examiner*—Lucien U. Toplu
*Attorney, Agent, or Firm*—Sughrue, Mion, Zinn, Macpeak & Seas

[57] ABSTRACT

A method of scheduling successive tasks subject only to timing constraints calculates for each task upper and lower limits of the interval in which execution of that task must start. It then constructs a first series in which all the tasks are scheduled in increasing order of their lower limit and a second series in which all the asks are scheduled in increasing order of their upper limit, before constructing an initial permutation by scheduling all the tasks in the order of the first series and verifying if the initial permutation satisfies all the constraints. If not all the constraints are satisfied, the method determines in the initial permutation the first ill-placed task for which a constraint is not satisfied and a candidate task in the second series immediately preceding the ill-placed task in the second series in the current permutation. It then verifies that if the candidate task is shifted in the current permutation to a position immediately after the ill-placed task all the constraints applying to all the tasks shifted in this way are then satisfied.

1 Claim, 13 Drawing Sheets

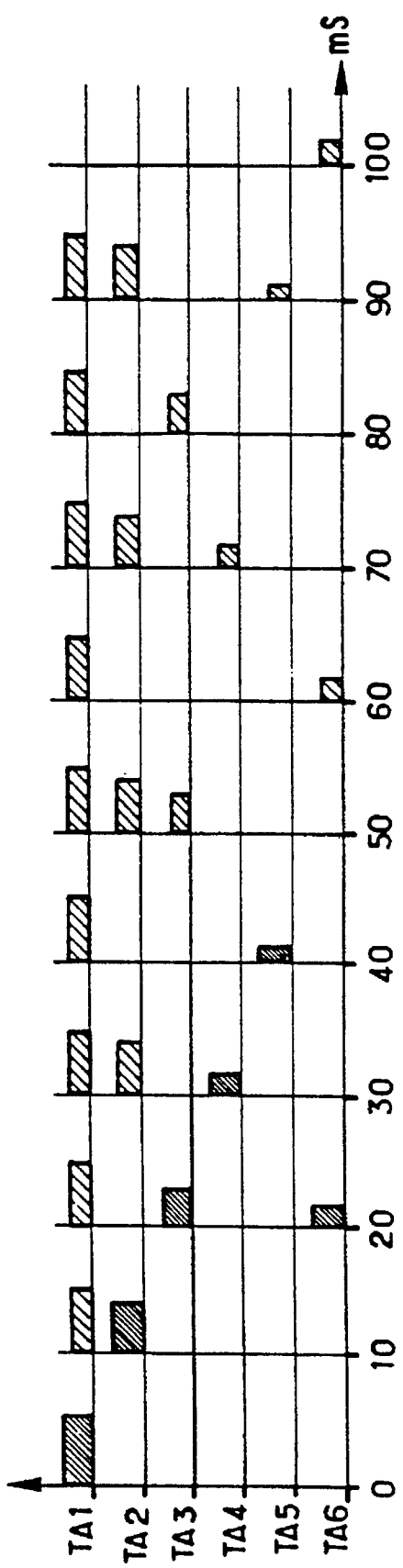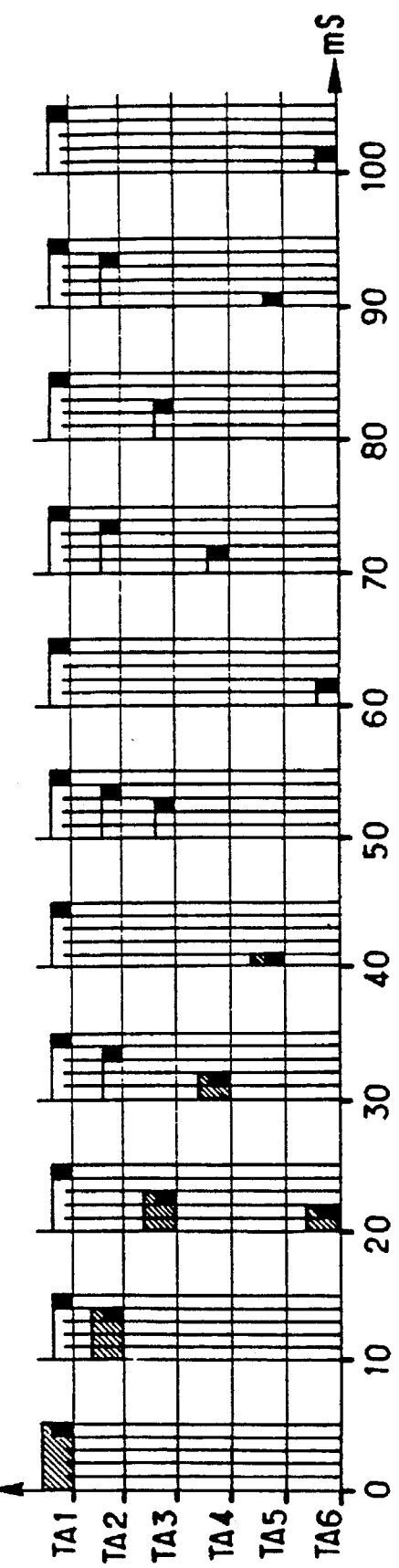

$PSi = X$
$PSi\_1$
$PSj = Q$

α

$PSi = Q$
$PSi\_1 = X$ $PSi = X$
$PSi\_1$
$PSj = Q$

β

$PSi = Q$
$PSi\_1 = X$

PSi = X
PSi_1
PSj = Q

PSi = Q
PSi_1 = X

PSi
PSi_1
PSj

PSi
PSi_1

METHOD OF SCHEDULING SUCCESSIVE TASKS SUBJECT ONLY TO TIMING CONSTRAINTS

BACKGROUND OF THE INVENTION

1. Field of the Invention

The invention concerns a method of scheduling successive tasks by means of a computer by determining a task execution order and an execution start time for each task, no two tasks ever being executed simultaneously. This scheduling is based on a plurality of constraints that the tasks must satisfy. This process is more particularly concerned with applications in which there is only one type of constraint, namely timing constraints: the execution of a task must begin at a time within at least one predetermined time interval relative to an absolute time reference. There are no constraints applying directly to the order of the tasks. The process naturally concerns also applications in which all constraints can be regarded as equivalent to timing constraints relative to an absolute reference.

The method of the invention is applicable in particular to tasks that must be executed successively because they are executed by single means capable of executing only one task at a time, for example: a machine tool, a data bus, a team of workers. In the field of electronic data processing, the method can be applied to the management of a plurality of predetermined tasks to be executed successively in the same processor or on the same bus. In the field of industrial process control, the method can be applied in particular to the management of a so-called field bus used to transmit information successively in accordance with a predetermined series.

2. Description of the Prior Art

The prior art includes many scheduling methods:

so-called polynomial or critical path methods;

linear programming methods, especially the simplex method on which the PROLOG III language is based;

dynamic programming methods that can be applied only to relatively small problems; and heuristic methods that use some algorithms employing the above methods but further reduce the number of cases to be verified by simplifying certain constraints; the resulting solution is then less than optimal.

The prior art methods have two drawbacks: they require a long computation time since they systematically verify a very large number of permutations before giving a solution. The computation time is usually proportional to the factorial of the number of tasks to be scheduled.

To schedule repetitive tasks the prior art methods determine the duration of a macrocycle equal to the lowest common multiple of all the task periods and the duration of a microcycle equal to the highest common denominator of all the task periods, and then look for a permutation of the tasks such that all the constraints are satisfied simultaneously, trying out all possible permutations until one verifying this condition is found, the verification being carried out microcycle by microcycle. If a conflict appears within a microcycle the permutation currently being verified is abandoned and another is tried. The work done in connection with verification of that permutation during previous microcycles becomes of no utility since all the constraints previously satisfied are called into question again.

The prior art methods are therefore somewhat impractical for use in industrial applications.

An object of the invention is to propose a scheduling method that is free of these drawbacks so that a solution to a static scheduling problem is obtained faster, and also to enable dynamic scheduling problems to be handled, i.e. to make it possible to carry out rescheduling as and when the number of tasks to be scheduled and/or the constraints applying to those tasks change. Dynamic scheduling can be beneficial in scheduling machining tasks on a machine tool, for example, if the products to be manufactured are highly diverse; for scheduling aircraft take-offs and landings on a runway; for scheduling tasks on a data bus or processor; etc.

SUMMARY OF THE INVENTION

The invention consists in a method for scheduling successive tasks by means of a computer, said tasks being subject only to timing constraints, a timing constraint requiring that the execution start time be in at least one predetermined time interval relative to an absolute reference time;

said method comprising the following successive steps in this order:

calculating for each task upper and lower limits of the interval in which execution of that task must start;

constructing a first series in which all the tasks are scheduled in increasing order of their lower limit and are scheduled in increasing order of their upper limits when several tasks have a same lower limit;

constructing a second series in which all the tasks are scheduled in increasing order of their upper limit and are scheduled in decreasing order of their lower limits when several tasks have a same upper limit and different lower limits;

constructing an initial permutation by scheduling all the tasks in the order of the first series;

verifying if said current permutation satisfies all the constraints supplying to the tasks, the tasks being considered one by one in the order corresponding to said current permutation to check whether each task satisfies all the constraints applying to said task;

concluding that the scheduling succeeds if all the constraints are satisfied;

otherwise, determining in said current permutation the first ill-placed task for which a constraint is not satisfied;

determining in the second series a candidate task immediately following the ill-placed task in said second series that also precedes the ill-placed task in the current permutation, said candidate being a task which has already been verified, all the tasks following said candidate task in said current permutation being not considered as satisfying all the constraints, any more;

verifying that if the candidate task is shifted to a position immediately after the ill-placed task all the constraints applying to all the tasks shifted in this way are then satisfied; and if at least one constraint is not satisfied, concluding that the candidate task is not suitable and then determining in the second series another candidate ask and repeating the previous verification; and, if this is not possible, concluding that the scheduling fails;

if all the constraints are satisfied, concluding that the scheduling succeeds.

This method has the advantage of being particularly fast since if the scheduling of a task fails it shifts one or more tasks preceding the task in respect of which scheduling has failed without systematically calling into question again all the constraints already satisfied, and therefore without calling into question again all of the work already done. This significantly reduces the computation time compared to any method that systematically explores all scheduling possibilities.

The method is also faster than the prior art methods in the case of repetitive tasks since the permutations are verified in a single microcycle. Finally, this method can be applied to scheduling a system in which a plurality of tasks can be carried out in parallel. It then consists in breaking the system down into a plurality of subsystems in which the tasks must all be executed successively and applying the method of the invention to each of these subsystems.

The method of the invention will be more clearly understood and other features of the invention will emerge from the following description of one embodiment of the invention and the accompanying drawings.

BRIEF DESCRIPTION OF THE DRAWINGS

FIGS. 2 and 3 show one step of the method of the invention adapted to take into account the periodic nature of certain tasks.

DETAILED DESCRIPTION OF THE PREFERRED EMBODIMENT

The method of the invention can be used for static or dynamic scheduling. Its reduction in computation time is particularly advantageous in dynamic scheduling, however, since it allows changing constraints and/or tasks to be dealt with in real time.

Figure 1:
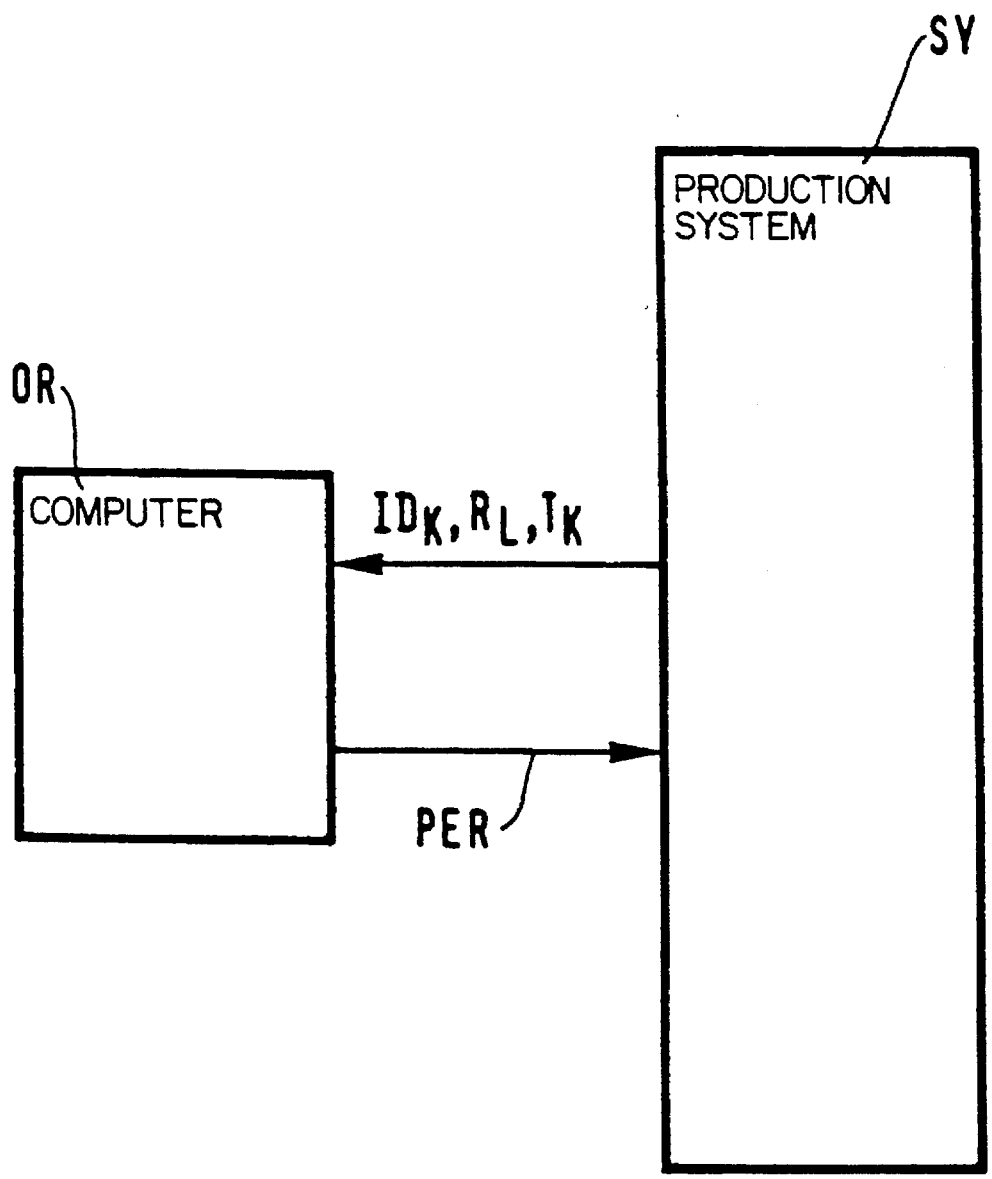
FIG. 1 shows the block schematic of a system in which the dynamic scheduling method of the invention is implemented.

FIG. 1 shows the block schematic of one embodiment of the device implementing the method of the invention for dynamic scheduling of industrial production tasks, for example.

The device includes a computer OR connected to a production system SY. The production system SY supplies to an input of the computer OR the parameters needed to determine a schedule: the identifier $ID_K$ of each task and, if appropriate, the period $T_K$ of each task and the definition $R_L$ of each constraint to be satisfied. These parameters are supplied each time that a change occurs in the nature of the task to be executed and/or in the constraints.

The computer then determines a new permutation PER and the production system SY then executes the tasks in accordance with that new permutation.

The tasks are usually executed by various devices of the system SY. The computer OR must be programmed to transmit to each device information indicating to it the times at which it can execute a task. The person skilled in the art will know how to program the computer OR to implement the method of the invention and to transmit information to each device and this programming will not be described beyond the description of the method itself. Likewise, the person skilled in the art will know what hardware to use to connect a computer OR to a system SY comprising various devices adapted to execute respective different tasks.

The method of the invention is not limited to static scheduling applications. The same steps can perform dynamic scheduling in real time.

Each constraint applies only to the execution start time, which muse be within a given interval $[t_{min}, t_{max}]$. Execution can continue beyond the limit of an interval, but it muse respect the fixed duration. If a plurality of timing constraints apply to the same task, they can be replaced by a single constraint for which the interval $[t_{min}, t_{max}]$ is obtained from the respective intervals of chose constraints by application of the AND operator.

A preliminary step of the method of the invention reduces the number of permutations to be verified by verifying the scheduling of tasks only during a microcycle which is the highest common denominator of all the task repetition periods. If a permutation is found such that if all the tasks are executed within the same microcycle and satisfy all the constraints, then that permutation will not lead to any conflict during any of the microcycles constituting a macrocycle, since the worst case scenario is that in which all the tasks occur in the same microcycle because multiples of their periods coincide.

FIG. 2 and 3 shows this preliminary step of the method of the invention. Note that in the case where one or more tasks are not to be regarded a priori as repetitive, it is sufficient to assign them an arbitrary common period, but one that facilitates the determination of a microcycle. It is therefore sufficient to determine the value of the highest common denominator of the period of the repetitive tasks and then to choose a multiple of that value to constitute common periods for all the non-repetitive tasks.

FIGS. 2 and 3 relate to the example in which six periodic tasks T1 through T6 with respective periods of 10 ms, 20 ms, 30 ms, 40 ms, 50 ms and 40 ms have to be scheduled. The execution time is the same for all the tasks and is equal to 1 ms.

In FIG. 2 the time intervals $[t_{min}, t_{max}]$ for each task are shown cross-hatched.

These intervals are as follows:

| TA1 $[t_{min}, t_{max}] =$ | [0, 4 ms] modulo 10 ms |
|---|---|
| TA2 | [10, 13 ms] modulo 20 ms |
| TA3 | [20, 23 ms] modulo 30 ms |
| TA4 | [30, 32 ms] modulo 40 ms |
| TA5 | [40, 41 ms] modulo 50 ms |
| TA6 | [20, 22 ms] modulo 40 ms |

These tasks have a macrocycle equal to the lowest common multiple of their period, which is 600 ms. A macrocycle can be divided into 60 microcycles each of 10 ms. Two repetitive tasks can be in conflict if they have to be executed during the same microcycle. For example, the tasks TA1, TA3 and TA6 must be executed during the same microcycle [20 ms, 30 ms] then [120 ms, 140 ms], etc.

To determine a schedule that suits the worst case scenario, it is sufficient to consider a microcycle in which all tasks without exception must be executed once. In practise, the tasks do not all occur in the same microcycle. An imaginary case in which this event occurs is considered below.

Time shifting can shift the execution time of each task into the interval of the same microcycle [0, 10 ms]. It is defined by the formula:

$$t_{st}^{Kimag} = t_{st}^{K} - k.PGCD$$

where $t_{st}^{Kimag}$ is the imaginary execution start time of a task K;

$t_{st}^{K}$ is the real execution start time of the task K;

PGCD is the duration of a microcycle, i.e. the highest common denominator of the periods; and k is an integer such that the imaginary execution start time $t_{st}^{Kimag}$ of the task K is shifted into the required microcycle, in this instance the microcycle [0, 10 ms].

The interval $[T_{min}^{K}, T_{max}^{K}]$ defined by all the constraints applying to the task K is therefore also shifted by $-k.PGCD$.

The scheduling method of the invention is then applied in this interval [0, 10 ms]. When a permutation satisfying all the constraints has been determined, the actual execution times $t_{st}^{K}$ are deduced from the imaginary execution start times using the formula:

$$t_{st}^{K}=t_{st}^{Kimag}+k.PGCD \text{ modulo the period of the task K.}$$

FIG. 3 shows the resulting scheduling of the tasks over the interval 0 to 100 ms, the interval 100 ms to 600 ms not being shown but being scheduled in a similar way. Each execution interval is shown in black. Consider, for example, the interval 20 ms to 30 ms in which there can be conflict between the tasks TA1, TA3 and TA6. The task TA1 is executed in the interval 23 ms to 24 ms. The task TA3 is executed in the interval 22 ms to 23 ms. The task TA6 is executed in the interval 21 ms to 22 ms. Thus TA1 and TA3 or TA6 are never executed simultaneously, regardless of the microcycle in question, which is one of the 60 microcycles constituting the macrocycle [0, 600 ms].

in an application in which some tasks can be executed simultaneously, this preliminary step further consists in grouping the tasks into a plurality of independent subsets, if possible, each subset containing only tasks related by constraints. Scheduling a plurality of subsets independently is faster than scheduling a single more complex set.

Figure 4:
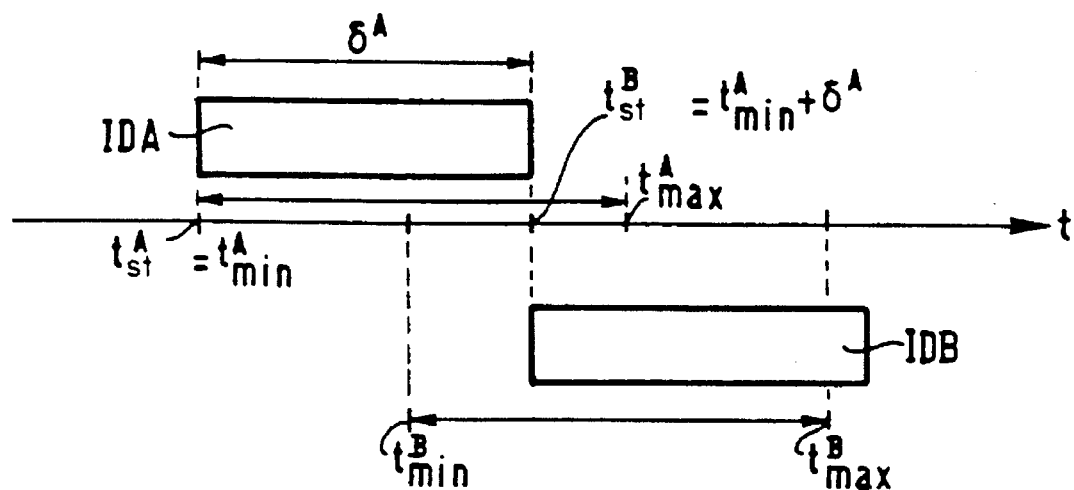
FIGS. 4 through 7 show the basic principles of the method of the invention.

FIGS. 4 through 7 show the basic principles of the method of the invention for scheduling all the tasks of a set of tasks in which the number of permutations to be verified is minimized. This procedure succeeds if it determines a permutation constituting a schedule satisfying all the constraints applying to the tasks in FIG. 4 shows a timing diagram illustrating a first basic principle of the method of the invention. This first basic principle imposes priority execution of tasks for which the time interval starts the soonest, i.e. with the smallest value $t_{min}$. In practise the initial permutation of the tasks, i.e. the first permutation to be verified, is constituted by a series MIN-SERIES, in which the tasks are arranged in increasing order of their $t_{min}$ values.

The rectangles IDA and IDB in FIG. 4 show time intervals respectively assigned to the execution of a task A and to the execution of a task B. Constraints require that execution of task A start within an interval $[t_{min}^{A}, t_{max}^{A}]$ or at worst at time $t_{max}^{A}$. They require execution of task B start within an interval $[t_{min}^{B}, t_{max}^{B}]$ or, at worst, at time $T_{max}^{B}$. In this example $t_{min}^{A}$ is before $t_{min}^{B}$. The first basic principle is to execute task A first, shifting the interval in which this execution occurs as close as possible to the lower limit $t_{min}^{A}$; then executing task B during an interval IDB starting as close as possible to the lower limit $T_{min}^{B}$ without overlapping the interval IDA. In this example the interval IDA has a duration $\delta^{A}$ which overlaps the interval $[T_{min}^{B}, T_{max}^{B}]$ and consequently the intervals IDA and IDB will be as close together as possible by choosing:

$$t_{st}^{B}=t_{min}^{A}+\delta^{A}$$

Figure 5:
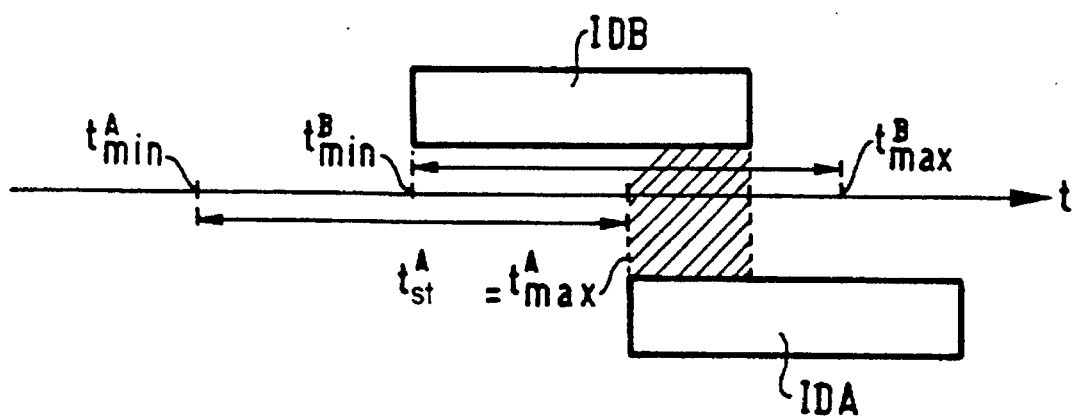

FIG. 5 shows, for the same example, the consequences of failure to apply this basic principle, i.e. of having task B executed before task A. The execution interval IDB then starts as soon as possible, i.e. at the lower limit of the interval $[T_{min}^{B}, T_{max}^{B}]$. The execution interval IDA should start after the end of the execution interval IDB in order not to overlap the interval IDB, but in the example the execution interval IDB has a length such that it goes beyond the upper limit $t_{max}^{A}$ of the interval in which starting execution of task A is permitted. At best, task A could start at time $t_{st}^{A}=t_{max}^{A}$, but then the two execution intervals IDB and IDA overlap. The overlap area is cross-hatched in FIG. 5.

The example thus shows that failing to respect the first basic principle increases the probability that some constraints will not be satisfied.

Figure 6:
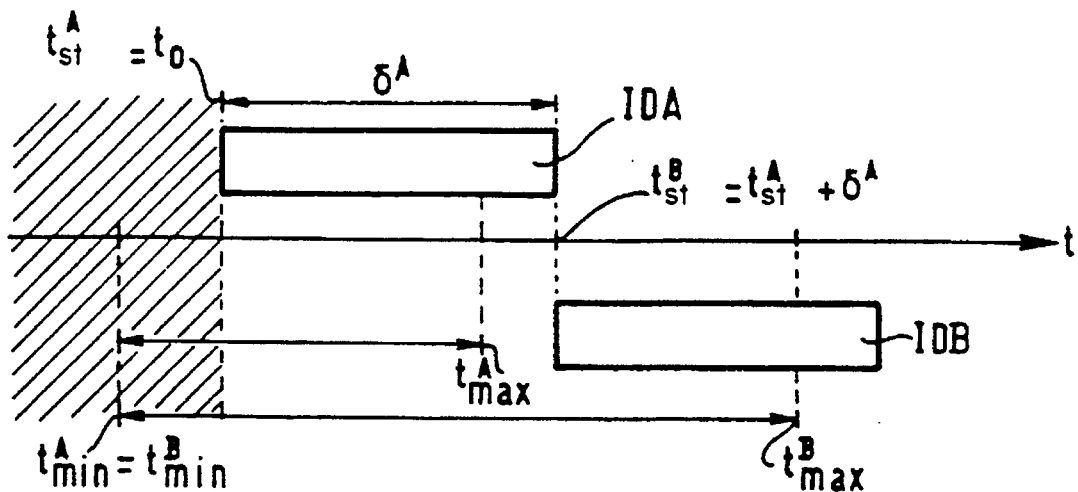

FIG. 6 shows a timing diagram illustrating a second basic principle of the method of the invention. This basic principle chooses the task to be given execution priority from a plurality of tasks for which the lower limit $t_{min}$ has the same value. In this case, this second basic principle imposes priority execution of the task for which the upper limit $t_{max}$ has the smallest value.

In example shown in FIG. 6, two tasks A and B have the same lower limit $t_{min}^{A}=t_{min}^{B}$ for the time interval in which execution must start. Constraints imposed by the existence of other execution intervals that are not shown prohibit execution of tasks A and B before a time $t_0$ after $t_{min}^{A}=t_{min}^{B}$, in a time interval shown cross-hatched. Thus the execution intervals IDA and IDB can only start from this time $t_0$. The upper limit $T_{max}^{B}$ for task B is greater than the upper limit $t_{max}^{A}$ for task A. In accordance with the second basic principle, task A takes priority for execution. Task B is then executed from a time:

$$t_{st}^{B}=t_{min}^{A}+\delta^{A}$$

Thus the two execution intervals IDA and IDB occur one after the other with no particular problem due to the upper limit $T_{max}^{B}$.

Figure 7:
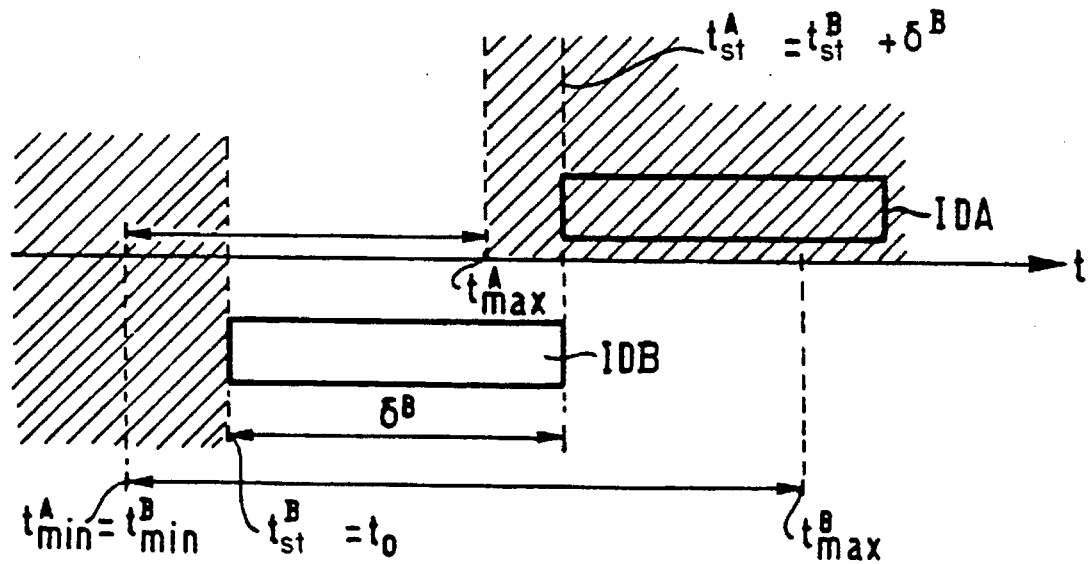

FIG. 7 shows, for the same example, a conflict that is more likely to occur if the second basic principle is not respected. Task B is executed first, from time $t_{st}^{B}$ which coincides with the end $t_0$ of the prohibited interval shown by the cross-hatching. Task A must then be executed from a time $t_{st}^{A}=T_{min}^{B}+\delta^{A}$ to prevent the intervals IDA and IDB overlapping, but this time $t_{st}^{A}$ would then be in a prohibited area, shown cross-hatched in the figure after the upper limit $t_{max}^{A}$ of the interval in which execution should start. There is therefore a constraint that is not satisfied. This example shows that failing to respect the second basic principle increases the probability that some constraints will not be satisfied.

Figure 8:
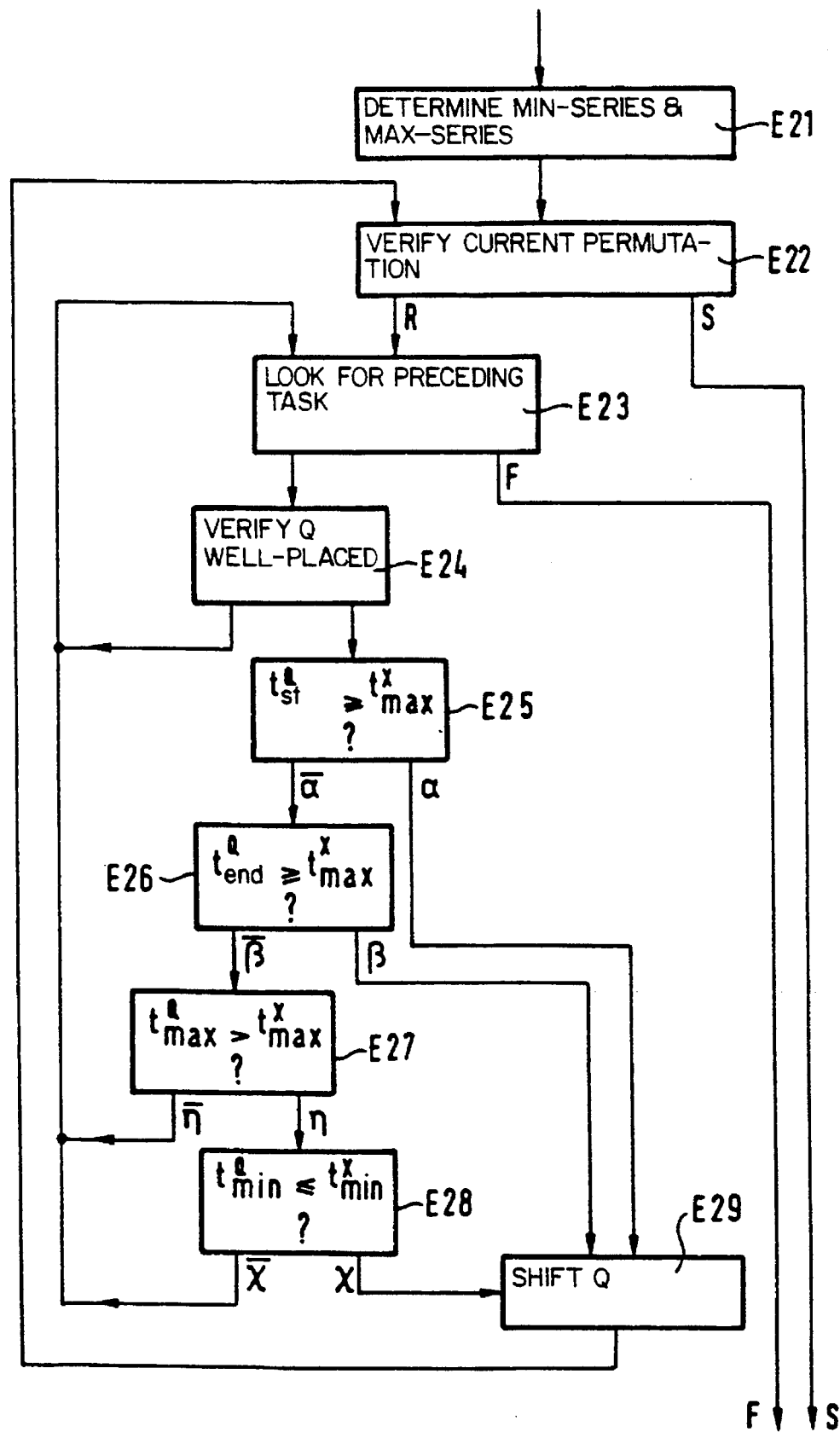
FIG. 8 shows the flowchart of one embodiment of the invention.

FIG. 8 shows a flowchart of a preferred embodiment of the method of the invention. It starts with a step E21 to determine the series MIN-SERIES comprising all the tasks scheduled in increasing order of their lower limit $t_{min}$. This series will be used to apply the first basic principle stated above. To maximize the probability of finding quickly a permutation that satisfies all the constraints applying to all the tasks, the initial permutation is constituted by MIN-SERIES and the permutations verified thereafter, in the event of failure, are deduced from MIN-SERIES by successive modifications.

Step E21 also determines the series MAX-SERIES comprising all the tasks in increasing order of their upper limit $t_{max}$. This series will be used to apply the second basic principle stated above if the initial permutation has to be modified.

The next step E22 verifies the current permutation, i.e. verifies if it satisfies all the constraints applying to all the tasks. At the beginning of this step the current permutation is the initial permutation determined by step E21.

This verification consists in taking each successive task in the order of the current permutation and verifying that the execution interval $[t_{st}, t_{end}]$ imposed by the position occupied by that task in the current permutation is compatible with the time interval $[t_{min}, t_{max}]$ imposed by the constraints that apply to that task. The task for which this verification is in progress is called the current task. If the result of the verification is positive for each of the tasks, this indicates that the current permutation succeeds (S).

If the verification finds at least one task whose position in the permutation imposes starting execution at a time $t_{st}$ that is not in the time interval $[t_{min}, t_{max}]$ imposed by the constraints, that task is regarded as ill-placed since there is a conflict between two constraints. When step E22 finds a task (X) that is the first ill-placed task in the current permutation, it draws the conclusion (R) that it is necessary to look for a task that is a candidate for shifting to constitute a new permutation. The method then executes a step E23 which looks for the task immediately following the current task X in the series MAX-SERIES. If there is no such task, step E23 fails (F).

If step E23 finds a candidate task Q immediately following the current task X in the series MAX-SERIES, the next step E24 of the method verifies that the task Q has already been considered to be well-placed during an earlier step E21. All the tasks considered to be well-placed are those which have a position below that of the current task X, since the verification of step E22 is carried out according to increasing positions in the current permutation. Consequently, step E24 simply verifies that the candidate task Q precedes the current task X in the current permutation. If step E24 determines that the task Q was not considered to be well-placed, then step E23 is repeated to find another candidate task immediately following the task Q in MAX-SERIES.

On the other hand, if the candidate task Q was considered to be well-placed, the next step E25 of the method compares the execution start time $t_{st}^Q$ of the task Q to the upper limit $t_{max}^X$ of the time interval corresponding to the current task X.

If $t_{st}^Q \geq t_{max}^X$, the outcome is that denoted $\alpha$. The next step is then a step E29 which shifts the task Q in the current permutation to insert it between the current task X and the task after the task X in the current permutation. The tasks that were between Q and X, and the task X itself, are shifted one position downwards to fill in the space left free by Q. Consequently, the task Q subsequently occupies the position that was previously that of X. The method then repeats step E22 to verify if the new current permutation obtained in this way satisfies all the constraints. Note that the task Q and all the other tasks that followed it have been shifted. They can no longer be considered to have been well-placed as they do not necessarily satisfy all the constraints in their respective new positions. The tasks below Q retain the same position, and it is therefore not necessary to verify that they satisfy all the constraints applying to them, and therefore the work of verifying those constraints is not done again.

if $t_{st}^Q < t_{max}^X$, the outcome is that denoted $\overline{\alpha}$ (see below) and the next step of the method is step E26.

Figure 9:
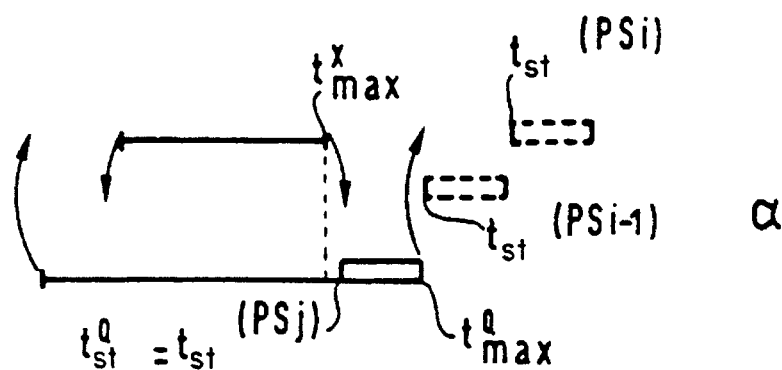
FIGS. 9 through 16 show timing diagrams illustrating the use of the flowchart shown in FIG. 8.

FIG. 9 shows the outcome $\alpha$, for example. The execution intervals are shown in dashed outline if a conflict prevents execution and in full outline otherwise.

Consider a task X in position PSi of the current permutation and a task Q considered to be well-placed and in position PSj of the current permutation. The position PSi imposes the start of execution of task X at a time $t_{st}$ (PSi) that is beyond the limit $t_{max}^X$. The position PSj imposes the start of execution of task Q at a time $t_{st}$ (PSi) which in this example is beyond the time $t_{max}^X$. Since the time $t_{st}^Q$ (PSi) is beyond the time $t_{max}^X$, the limit $t_{max}^Q$ is therefore a fortiori greater than or equal to $t_{max}^X$ and therefore has a chance of being near $t_{st}$ (PSi), the ideal being that $t_{st}$ (PSi) falls short of $t_{max}^Q$.

Figure 10:
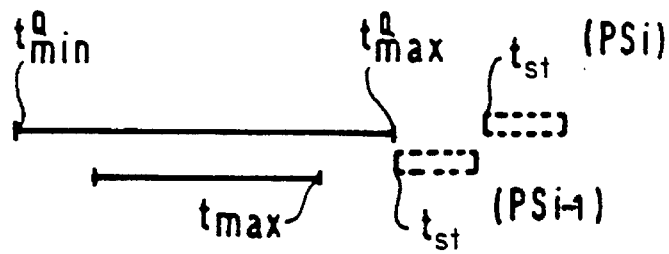

FIG. 10 shows that by shifting the tasks Q and X respectively into the positions PSi-1 and PSi, the probability that the time $t_{st}$ (PSi-1) falls in the interval $[T_{min}^X, t_{max}^X]$ is greater than the probability that the time $t_{st}$ (PSi) had of falling in this same interval, because $t_{st}$ increases systematically with the position PS. The figure shows that the end $t_{max}^X$ of the segment corresponding to task X has moved closer to an execution interval, namely that which starts at $t_{st}$ (PSi-1), and therefore has a greater chance of intersecting with that interval.

The end $t_{max}^Q$ of the segment corresponding to the task Q has a non-null chance of intercepting the rectangle representing the execution interval starting at time $t_{st}$ (PSi). Consequently, the new permutation has a greater chance than the old one of satisfying all the constraints and it is therefore beneficial to try out this new permutation. In the example shown, $t_{st}$ (PSi-1) is beyond $t_{max}$ and there is therefore still a conflict in respect of the task X. It is therefore necessary to make one or more further modifications to the current permutation.

In this example, $t_{st}$ (PSi) is beyond $t_{max}^Q$ and there is therefore also a conflict in respect of the task after the shift. However, in other examples corresponding to the outcome $\alpha$ it may be that the constraints applying to X and those applying to Q are satisfied simultaneously. Consequently, it is beneficial to verify any new permutation corresponding to the out come $\alpha$.

In the case of the outcome $\overline{\alpha}$, on the other hand, further verifications are needed before it is possible to conclude that the task Q is a worthwhile candidate task. The next step of the method is then step E26 that compares the time $t_{end}^Q$ of end of execution of the task Q to the upper limit $t_{max}^X$ of the interval in which execution of the task X must start. If $t_{end}^Q \geq t_{max}^X$, the outcome is that denoted $\beta$ and the next step of the method is the step E30 which shifts the task Q to insert it after the task X. The contrary outcome is that denoted $\overline{\beta}$. Other verifications are needed before it is possible to conclude that the task Q is a worthwhile candidate task.

Figure 11:
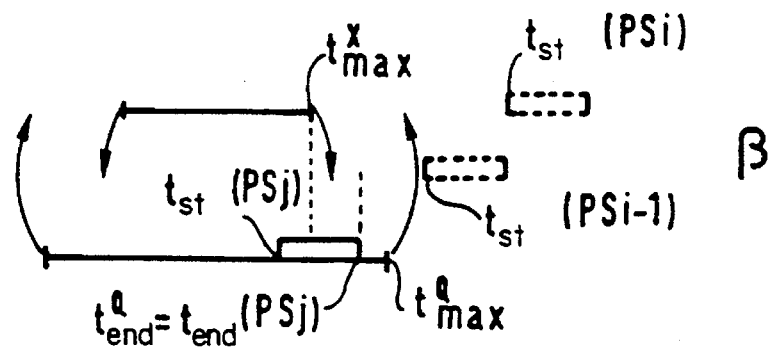
Figure 12:
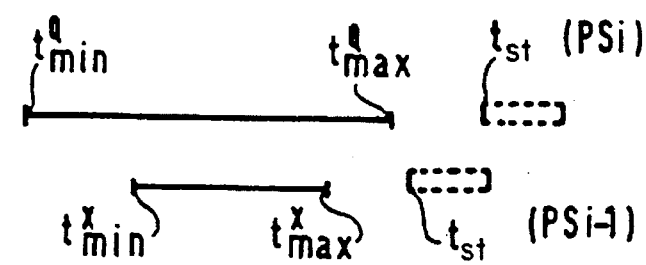

FIGS. 11 and 12 show the outcome $\beta$. FIG. 11 shows a task X in the position PSi and a task Q in the position PSj such that the outcome $\overline{\alpha}$ and the outcome $\beta$ apply: the time $t_{end}^Q$ of end of execution of the task Q, i.e. the time $t_{end}$(PSi) imposed by the position PSj of Q in the current permutation, is beyond the time $t_{max}^X$.

FIG. 12 shows that by displacing the tasks Q and X to the positions PSi-1 and PSi, respectively, the probability that the time $t_{st}$ (PSi-1) falls in the interval $[T_{min}^X, t_{max}^X]$ is greater than the probability that the time $t_{st}$ (PSi) had of falling in that same interval, because $t_{st}$ increases systematically with the position PS. What is more, the time $t_{end}^Q = t_{end}$ (PSi) is beyond the limit $t_{max}^X$ and there is no conflict. This means that $t_{max}^Q$ is either greater than $t_{max}^X$ or slightly less than $t_{max}^X$, being at most at a distance equal to the interval $[t_{st}$ (PSj), $t_{end}$ (PSj)]. There is therefore little chance that $t_{max}^Q$ is greater than $t_{max}^X$ and therefore in this case there is little chance that $t_{max}^Q$ will be beyond $t_{st}$ (PSi) after the shift. It is therefore worthwhile to try out a permutation corresponding to the outcome $\beta$, which will not necessarily be a waste of time.

In the example shown in FIG. 12, the shifting of Q and X is not sufficient for all the constraints on Q and X to be satisfied. The current permutation needs to be modified a little more.

In the case of the outcome $\bar{\beta}$, step E27 compares the upper limit $t_{max}^Q$ of the time interval in which execution of task Q must start to the upper limit $t_{max}^X$ of the time interval in which execution of task X must start. If $t_{max}^Q > t_{max}^X$, the outcome is denoted $\eta$ and the next step of the method is then a step E28. The contrary outcome is that denoted $\bar{\eta}$ and step E23 is then repeated since there is no chance that the candidate task Q is worthwhile.

Figure 13:
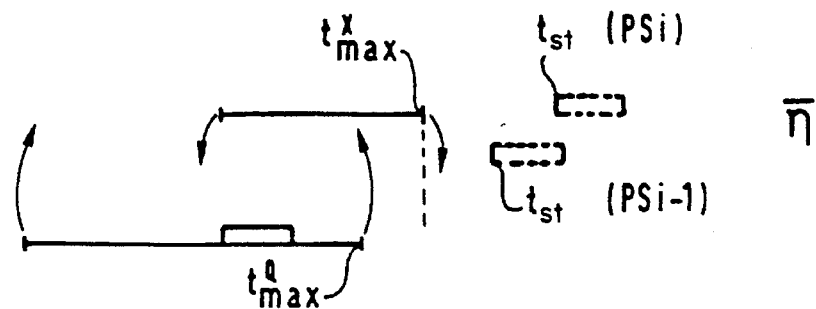
Figure 14:
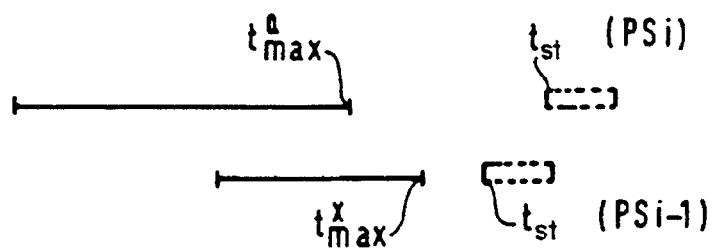

FIGS. 13 and 14 show the outcome $\bar{\eta}$ by means of an example in which the limit $t_{max}^Q$ is before the time $t_{max}^X$.

FIG. 13 shows the tasks X and Q shifted into the positions PSi-1 and PSi, respectively. This figure shows that the time $t_{max}^Q$ is closer to the time $t_{st}$ (PSi) than it was to the time $t_{st}$ (PSj) but there is no chance of the task Q being executed since $t_{max}^Q$ is still farther from $t_{st}$ (PSi) than $t_{max}^Q$ was. Since there is a 100% chance of the task Q being ill-placed, it is not worthwhile to attempt any modification of the current permutation and for this reason the next step of the method is a step E23 that looks for another candidate task for shifting.

In the case of outcome $\eta$, step E28 compares the lower limit $t_{min}^Q$ of the interval in which execution of task Q must start with the lower limit $T_{min}^X$ of the time interval in which the execution of task X must start.

The objective of this step E28 is to verify that the task Q is before the current task X in the series MIN-SERIES so that the task Q can be moved after the task X. Otherwise (outcome $\bar{\alpha}$) the next step of the method is a step E23 that looks for another task that is a candidate for shifting.

In the case of the outcome $\chi$, the next step of the method is a step E29 that shifts the task Q after the task X; step E22 is then repeated to verify if all the constraints applying to the tasks of the current layer are satisfied.

Figure 15:
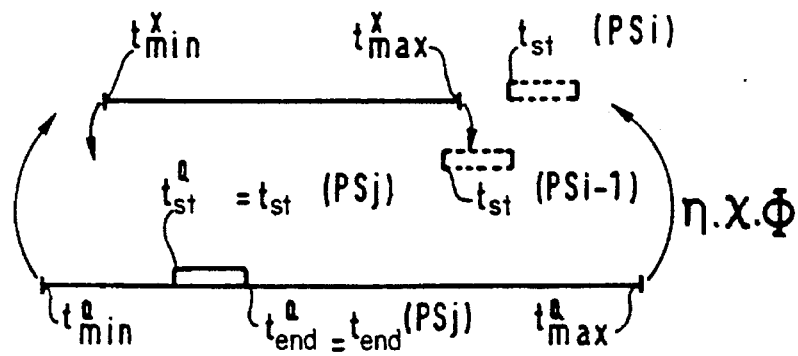

FIG. 15 shows an example in which the outcomes $\alpha$, $\beta$, $\chi$, $\eta$ apply simultaneously.

Figure 16:
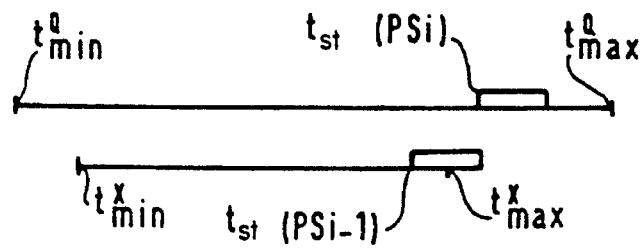

FIG. 16 shows the tasks X and Q shifted into the positions PSi-1 and PSi, respectively, in an example in which the constraints are such that they are satisfied after this shifting: $t_{st}$ (PSi) is in the interval $[t_{min}^Q, t_{max}^Q]$ and $t_{st}$ (PSi-1) is in the interval $[T_{min}^X, t_{max}^X]$.

FIGS. 17 through 26 show the implementation of step E2 for scheduling a layer comprising thirteen tasks: A, B, C, D, E, G, J, K, L, N, P, S, T.

Figure 17:
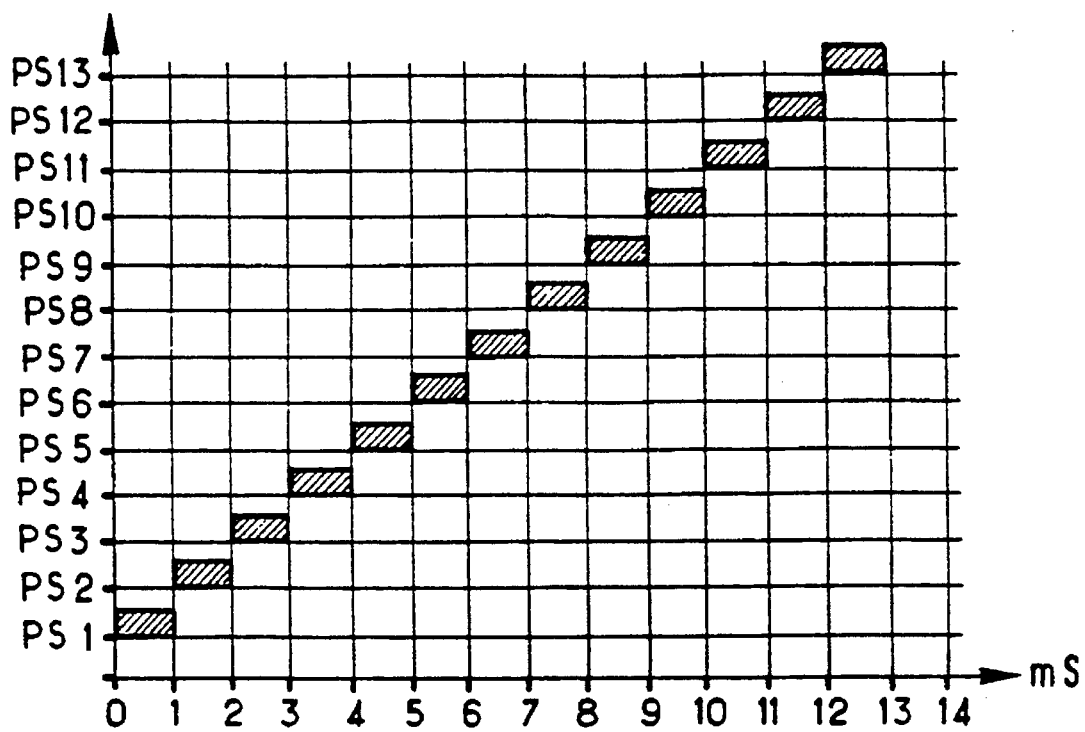
FIGS. 17 through 26 show one example of the use of the method of the invention to schedule tasks.

FIG. 17 shows on a time scale from 0 to 14 ms the position of the execution intervals respectively corresponding to thirteen positions PS1 through PS13. The tasks are executed in the order of the positions PS1 through PS13 and each execution interval has a duration equal to 1 ms.

Each task must satisfy one or more constraints that result in a single constraint. The start of the execution interval (cross-hatched rectangle in FIG. 17) must be in a given time interval (bold segments in FIG. 18). In the worst case it can begin at the upper limit.

Step E21 determines the series MIN-SERIES comprising all the tasks of the current layer scheduled in increasing order of their lower limit $t_{min}$.

MIN-SERIES=N, J, S, D, E, B, T, A, K, P, L, C, G.

Figure 18:
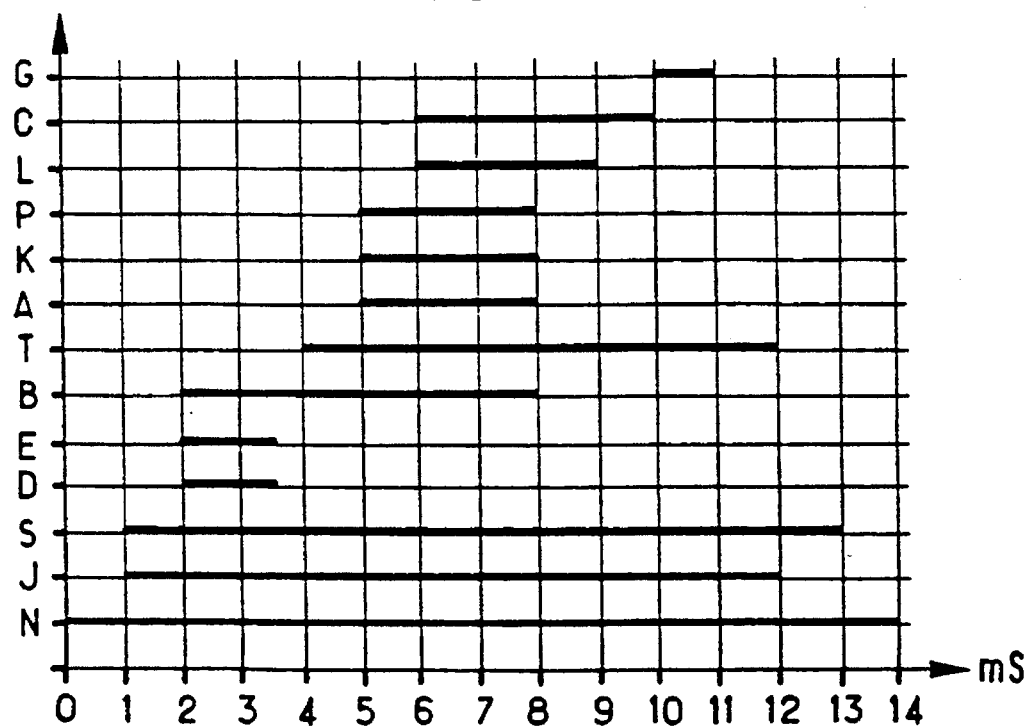

In FIG. 18 the thirteen tasks are shown in the same order as MIN-SERIES, along the ordinate axis. To maximize the probability of quickly finding a permutation that satisfies all the constraints applying to the tasks of the layer in question, the so-called initial permutation verified first is that consisting of MIN-SERIES, and those verified thereafter, in the event of failure, are deduced from MIN-SERIES by successive modifications.

Step E21 further determines the series MAX-SERIES comprising all the paths of the current layer scheduled in order of increasing $t_{max}$ values. This series will be used to apply the second basic principle stated above if the initial permutation has to be modified. In this example:

MAX-SERIES=E, D, A, K, P, B, L, C, G, T, J, S, N

A step E22 then verifies the current permutation, i.e. verifies if it satisfies all the constraints applying to the tasks of the layer in question. At the start of step E2 the current permutation is the initial permutation determined by step E21.

The verification is performed successively for each task, in the order of the current permutation: N, J, S, D, E . . ., G. If the result of the verification is positive for a task, that task is considered to be well-placed in the permutation, but its position can be called into question again subsequently if this is needed to satisfy other constraints.

Comparing FIGS. 17 and 18 shows that there is no problem in executing the tasks N, J, S and D, respectively, during the execution intervals shown in FIG. 17. They are therefore all considered to be well-placed, the current permutation is:

N, J, S, D, E, B, T, A, K, P, L, C, G.

The tasks underlined are those considered to be well-placed.

Figure 19:
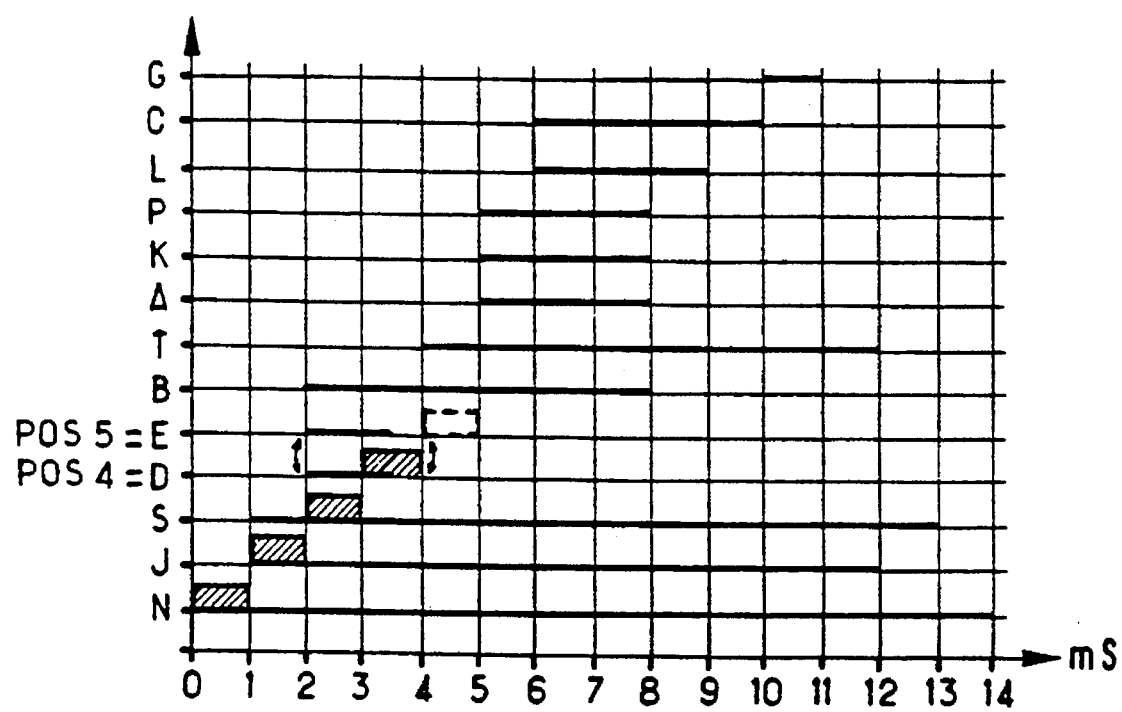

FIG. 19 shows the first conflict encountered in verifying the initial permutation. Cross-hatched rectangles in FIG. 19 represent execution intervals for which there is no conflict between the constraint and a dashed outline black rectangle shows the execution interval that is causing a conflict. It corresponds to the position PS5 currently occupied by the task E. This execution interval does not intersect the interval in which the execution of the task E must start. Step E23 therefore looks in the series MAX-SERIES for a task following the task E, i.e. such that the limit $t_{max}$ has a higher value.

MAX-SERIES=E, D, A, K, P, B, L, C, G, T, J, S, N

Step E23 finds the task D. Step E24 verifies that it is considered to be well-placed, by verifying that its position is below the position of the current task E in the current permutation. Step E25 then arrives at a conclusion $\bar{\alpha}$. Step E26 then arrives at a conclusion $\beta$. Step E29 then shifts D into the position POS5 and E moves back into the position POS4. Step E22 verifies that the constraints applying to E and the subsequent tasks are satisfied but finds that the constraint applying to D are no longer satisfied. The permutation tried out is not suitable. It is not retained at the new current permutation.

FIG. 19 shows that this modification cannot succeed because the interval corresponding to D has an upper limit which is not higher than that of the interval corresponding to E. They are in fact exactly the same. To prevent unnecessary verification of new permutations it is possible to take precautions when constructing MAX-SERIES during step E21:

If two tasks of the same layer have a common time interval constraint $[t_{min}, t_{max}]$, it is possible to put them in two different positions in the series MIN-SERIES that constitutes the initial permutation and in the series MAX-SERIES. In the example shown in FIGS. 17 through 26 there are at least two possibilities for constructing the series MAX-SERIES since it is possible to permutate D and E:

D, E, A, K, P, B, L, C, G, T, J, S, N

E, D, A, K, P, B, L, C, G, T, J, S, N

It would have been preferable to choose the order E, D that is the opposite of the order D, E in which they are taken to constitute the initial permutation.

MIN-SERIES=N, J, S, D, E, B, T, A, K, P, L, C, G.

Step E23 then finds as successive candidate tasks the tasks A, K, P, B, L, C, G, T, J and step E24 retains task J.

It can be shown that, as a general rule, if the masks of the layer to be scheduled have to satisfy only timing constraints, it is preferable to place in a reverse order all the tasks having the same interval [$t_{min}$, $t_{max}$] regardless of their number. On the other hand, if both timing constraints and sequence constraints apply, it is preferable to place them in the same order.

Consider the remainder of this example, retaining the initial choice of MAX-SERIES:

E, D, A, K, P, B, L, C, G, T, J, S, N

The current permutation is:

N, J, S, E, D, B, T, A, K, P, L, C, G.

After this unfortunate attempt to modify the permutation, step E23 finds as successive candidate tasks the tasks A, K, P, B, L, C, G, T and these are rejected by step E24 Step E23 then finds task J.

Figure 20:
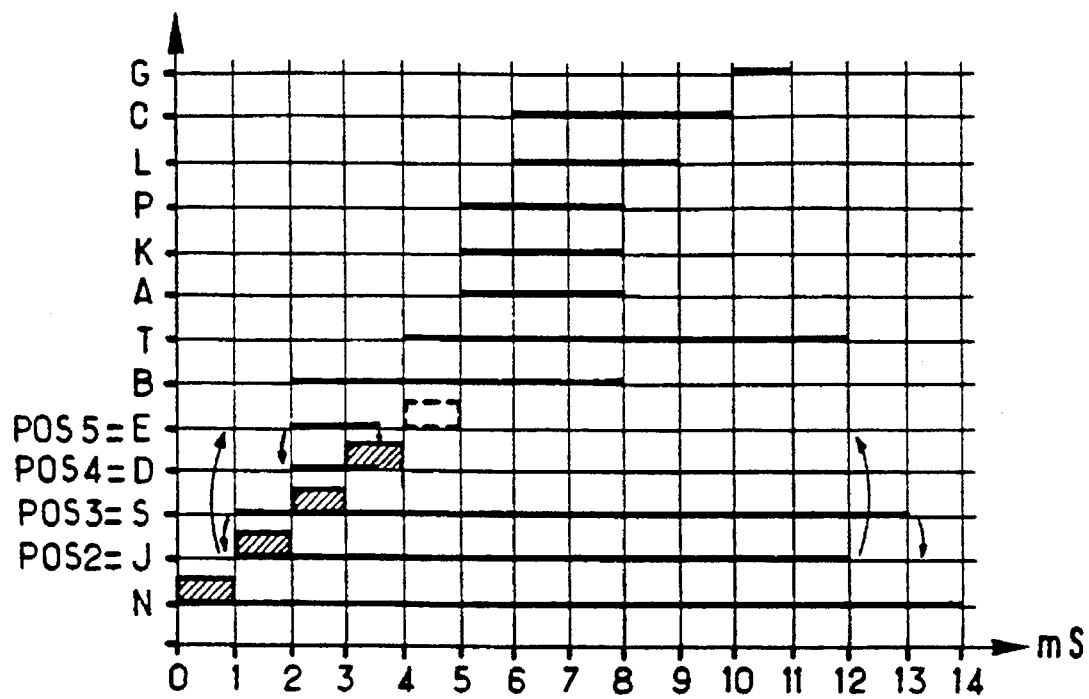

FIG. 20 shows this new attempt at modification. Step E24 verifies that task J is considered to be well-placed. Step E25 reaches the conclusion $\overline{\alpha}$. Step E26 reaches the conclusion $\overline{\beta}$. Step E27 and E28 arrive at the conclusions $\eta$ and $\chi$. Consequently step E29 places task J in position PS5 in place of E. Task E, D and S move back one place: S to position PS2, D to position PS3 and E to position PS4. The other tasks do not change place.

Step E22 then verifies that the tasks that have been shifted satisfy all the constraints applying to them, starting with the shifted task in the lowest position: S, then E, then D, then J. It then verifies that there is no conflict between the successive constraints for tasks B, T, A, K.

Figure 21:
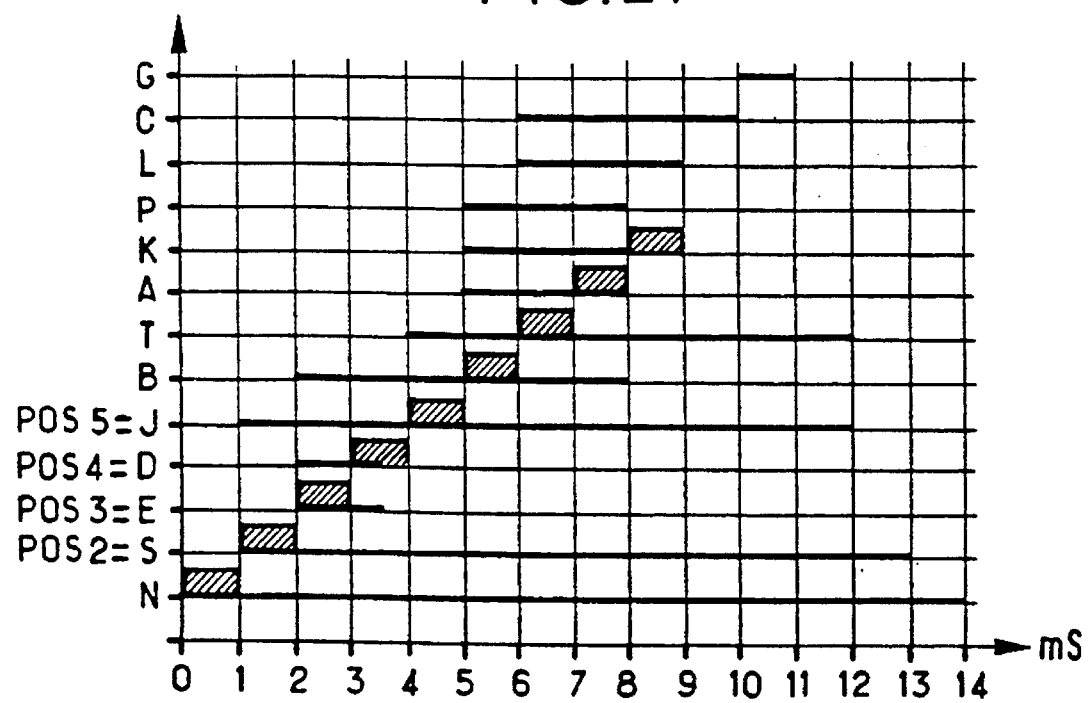

FIG. 21 shows the new current permutation. Note that the execution interval for task K starts at the exact time which is the end of the interval in which execution of task K should start. There is no conflict, but the constraints are satisfied. The current permutation is:

N, S, E, D, J, B, T, A, K, P, L, C, G.

Figure 22:
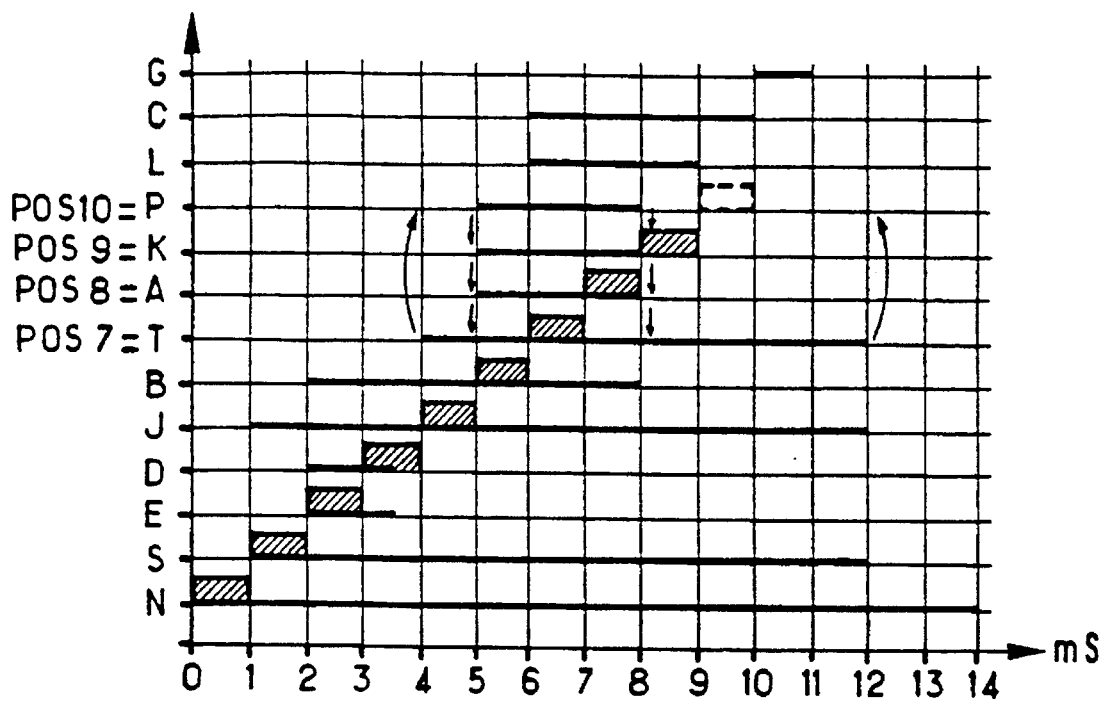

FIG. 22 shows that a conflict occurs for task P. Step E23 is then repeated to determine in the series MAX-SERIES the task immediately following the task P. It finds task B. Step E24 verifies that task B is considered to be well-placed. Steps E25 and E26 reach conclusions $\overline{\alpha}$ and then $\overline{\beta}$. Step E27 is then executed. This finds that $T_{max}^B = t_{max}^P$ and consequently arrives at the conclusion $\eta$. Step E23 is then repeated to find another candidate task in the series MAX-SERIES. The segment representing the time interval corresponding to B would not intersect with the execution interval [9 ms, 10 ms] corresponding to the position POS10 if task B were shifted to that position. Consequently, the constraints that apply to B would not be satisfied.

Step E23 then finds the successive tasks L, C, G but step E24 rejects them as they are not considered to be well-placed in the permutation. Finally, steps E23 and E24 find task T. Steps E25 through E28 successively arrive at the conclusions $\overline{\alpha}$, $\overline{\beta}$, $\eta$, $\chi$. Step E29 shifts T to position POS10. Tasks P, K, A move back into positions POS9, POS8, POS7, respectively.

Step E22 then verifies that the constraints applying to the shifted tasks A, K, P, T and the subsequent tasks are satisfied. The new current permutation is:

N, S, E, D, J, B, A, K, P, T, L, C, G.

Figure 23:
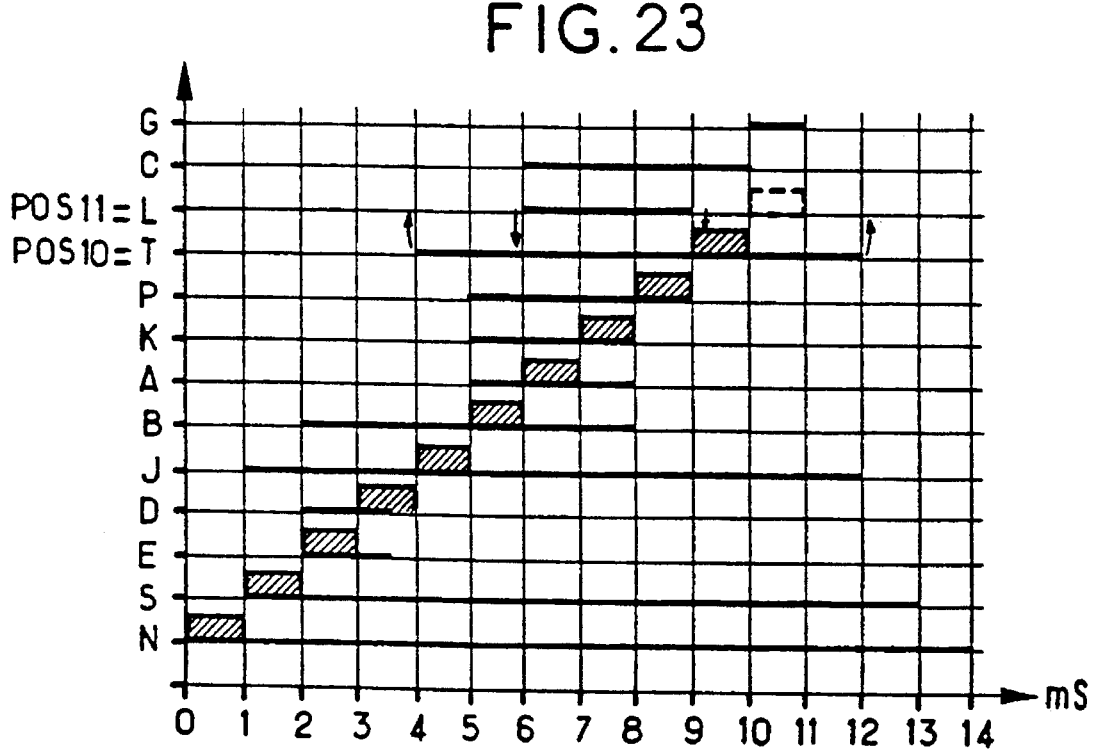

As shown in FIG. 23, step E22 then finds that the constraints applying to task L are not satisfied.

Step E23 then finds task T and step E24 verifies that it is considered to be well-placed. Step E25 and the subsequent steps can then be executed. They arrive at conclusions $\overline{\alpha}$, $\overline{\beta}$ then $\eta$ and $\chi X$. Step E29 can then be executed. It places task T in the position POS11 that was occupied by task L, which moves back one place. Step E22 verifies that the constraints applying to the shifted tasks L and T are satisfied. Consequently, the current permutation becomes:

N, S, E, D, J, V, A, K, P, L, T, C, G.

Figure 24:
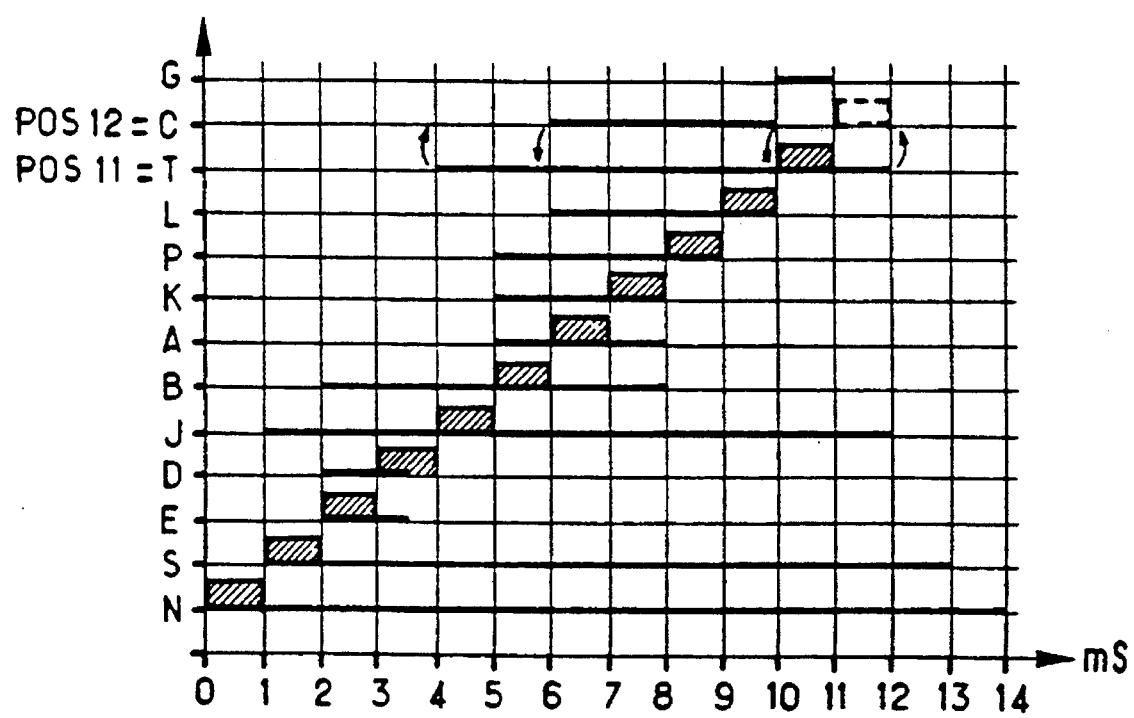

As shown in FIG. 24, there is a conflict between the constraints applying to task C. Step E23 determines the task following task C in the series MAX-SERIES. It finds task G but step E24 finds that task G is not considered to be well-placed in the permutation. Step E23 is repeated and determines another task T preceding task C in the series MAX-SERIES. Step E24 verifies that task T is considered to be well placed in the permutation. Step E25 arrives that the conclusion $\alpha$ since $t_{st}^T = t_{max}^C$. Step 29 is therefore executed immediately and places task T after task C in the permutation, which is the same thing as permutating the positions of C and T. Step E22 then verifies that all the constraints applying to the shifted tasks C and T are satisfied.

The new current permutation is:

N, S, E, D, J, B, A, K, P, L, C, T, G.

Figure 25:
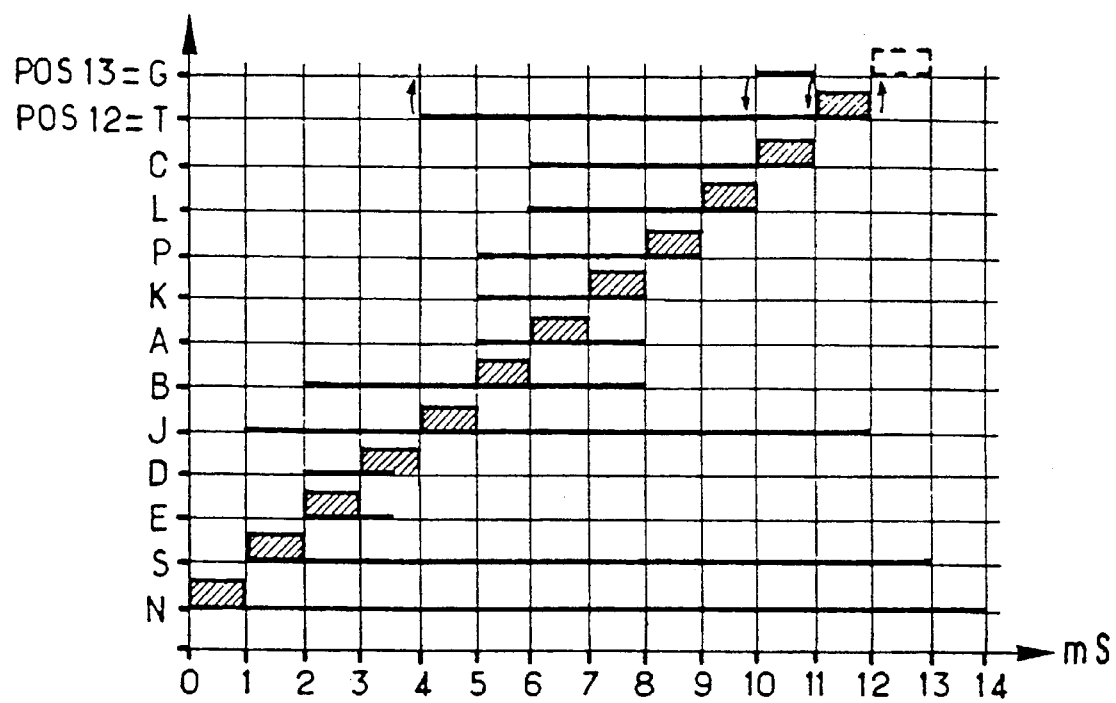

As shown in FIG. 25, step E22 finds that there is a conflict between the constraints applying to task G. Step E23 determines a task T immediately following task G in the series MAX-SERIES. Step E24 verifies that task T is considered to be well-placed in the permutation. Step E25 arrives at the conclusion $\alpha$ since $t_{st}^T = t_{max}^G$. Step E29 places T after G in the permutation, which is the same thing as permutating T and G. Step E22 then verifies that all the constraints applying to the shifted tasks G and T are satisfied. The new current permutation is:

N, S, E, D, J, B, A, K, P, L, C, G, T.

Figure 26:
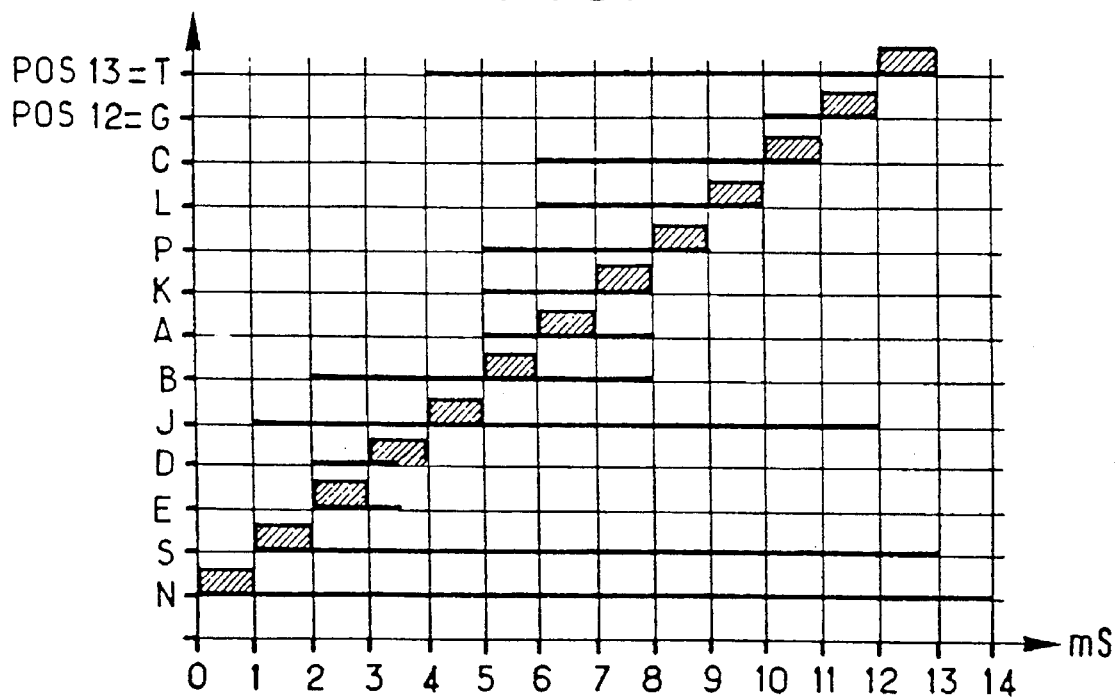

All the tasks are considered to be well-placed because all the constraints are satisfied, as shown in FIG. 26, and consequently step E22 succeeds (S).

There is claimed:

1. Method for scheduling successive tasks by means of a computer, said tasks being subject only to timing constraints, a timing constraint requiring that the execution start time be in at least one predetermined time interval relative to an absolute reference time;

said method comprising the following successive steps in this order:

calculating for each task upper and lower limits of the interval in which execution of that task must start;

constructing a first series in which all said tasks are scheduled in increasing order of their lower limit, and are scheduled in increasing order of their upper limit when several tasks have a same lower limit;

constructing a second series in which all said tasks are scheduled in increasing order of their upper limit, and are scheduled in decreasing order of their lower limits when several tasks have a same upper limit and have different lower limits;

constructing a current permutation, first by scheduling all said tasks in the order of said first series;

verifying if said current permutation satisfies all said constraints supplying to said tasks, the tasks being considered one by one in the order corresponding to said current permutation, to check whether each task satisfies all the constraints applying to said task;

concluding that the scheduling succeeds if all said constraints are satisfied;

otherwise, determining in said current permutation the first ill-placed task for which a constraint is not satisfied;

determining in said second series a candidate task immediately following said ill-placed task in said second series that also precedes said ill-placed task in said current permutation, said candidate being a task which has already been verified, all the tasks following said candidate task in said current permutation being not considered as satisfying all the constraints, any more;

verifying that if said candidate task is shifted to a position immediately after said ill-placed task all said constraints applying to all said tasks shifted in this way are then satisfied; and if at least one constraint is not satisfied, concluding that said candidate task is not suitable and then determining in said second series another candidate task and repeating the previous verification; and, if this is not possible, concluding that the scheduling fails;

if all said constraints are satisfied, concluding that the scheduling succeeds.

* * * * *